United States Patent
Bouzguarrou et al.

(10) Patent No.: US 12,050,917 B2
(45) Date of Patent: Jul. 30, 2024

(54) METHODS AND APPARATUS FOR TRACKING INSTRUCTION INFORMATION STORED IN VIRTUAL SUB-ELEMENTS MAPPED TO PHYSICAL SUB-ELEMENTS OF A GIVEN ELEMENT

(71) Applicant: Arm Limited, Cambridge (GB)

(72) Inventors: Houdhaifa Bouzguarrou, Valbonne (FR); Thibaut Elie Lanois, Peymeinade (FR); Guillaume Bolbenes, Vallauris (FR); Jonatan Christoffer Lövgren, Nice (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/566,157

(22) Filed: Dec. 30, 2021

(65) Prior Publication Data
US 2023/0214222 A1    Jul. 6, 2023

(51) Int. Cl.
*G06F 9/38*    (2018.01)

(52) U.S. Cl.
CPC .......... *G06F 9/3842* (2013.01); *G06F 9/3867* (2013.01)

(58) Field of Classification Search
CPC .... G06F 9/3806; G06F 9/3842; G06F 9/3867; G06F 1/32; G06F 1/3203; G06F 1/3206; G06F 1/3275; G06F 2212/601; G06F 2212/65; G06F 2212/657; G06F 2212/70; G06F 12/10; G06F 12/0864
See application file for complete search history.

(56) References Cited

U.S. PATENT DOCUMENTS 5,835,951 A * 11/1998 McMahan ............. G06F 9/3863
                                                                        711/158
5,944,817 A *  8/1999 Hoyt ..................... G06F 9/3806
                                                                        712/240

(Continued)

OTHER PUBLICATIONS

M. K. Qureshi, D. Thompson and Y. N. Patt, "The V-Way cache: demand-based associativity via global replacement," 32nd International Symposium on Computer Architecture (ISCA'05), Madison, WI, USA, pp. 544-555, (Year: 2005).*

(Continued)

*Primary Examiner* — Andrew Caldwell
*Assistant Examiner* — Kasim Alli
(74) *Attorney, Agent, or Firm* — NIXON & VANDERHYE P.C.

(57) ABSTRACT

Instruction information generation circuitry generates instruction information. Instruction information storage circuitry comprises a plurality of elements having physical sub-elements configured to temporarily store units of instruction information. Allocation circuitry is configured to receive, from the instruction information generation circuitry, given instruction information. It determines a mapping of a plurality of ordered virtual sub-elements, such that each virtual sub-element maps onto a respective one of said physical sub-elements. The given instruction information is stored into the virtual sub-elements of a given element, according to the mapping, such that at least one virtual sub-element lower in said order has a higher priority than at least one virtual sub-element higher in said order. Sub-element deactivation circuitry is configured to track usage of said virtual sub-elements across the plurality of elements and adaptively deactivate virtual sub-elements.

20 Claims, 5 Drawing Sheets

(56) References Cited

U.S. PATENT DOCUMENTS

| | | | | |
|---|---|---|---|---|
| 5,974,507 | A * | 10/1999 | Arimilli | G06F 12/123 711/134 |
| 6,823,426 | B2 * | 11/2004 | Goldschmidt | G06F 12/127 711/134 |
| 7,228,386 | B2 * | 6/2007 | Rowlands | G06F 12/0802 711/134 |
| 7,707,396 | B2 * | 4/2010 | Bradford | G06F 9/30174 712/238 |
| 7,827,372 | B2 * | 11/2010 | Bink | G06F 12/0864 711/3 |
| 2006/0218385 | A1 * | 9/2006 | Smith | G06F 9/3848 712/E9.056 |
| 2008/0028139 | A1 * | 1/2008 | Cypher | G06F 9/3826 711/108 |
| 2008/0320288 | A1 * | 12/2008 | Yokoi | G06F 9/3806 712/240 |
| 2012/0284462 | A1 * | 11/2012 | Licht | G06F 9/3814 711/128 |
| 2017/0300418 | A1 * | 10/2017 | Reed | G06F 12/128 |

OTHER PUBLICATIONS

J. D. Collins and D. M. Tullsen, "Hardware identification of cache conflict misses," MICRO-32. Proceedings of the 32nd Annual ACM/IEEE International Symposium on Microarchitecture, Haifa, Israel, pp. 126-135 (Year: 1999).*

Seznec, André, and Francois Bodin. "Skewed-associative caches." Proc. Int. Conf. on Parallel Architectures and Languages (PARLE). (Year: 1993).*

A. Ros, P. Xekalakis, M. Cintra, M. E. Acacio and J. M. Garcia, "Adaptive Selection of Cache Indexing Bits for Removing Conflict Misses," in IEEE Transactions on Computers, vol. 64, No. 6, pp. 1534-1547 (Year: 2015).*

* cited by examiner

METHODS AND APPARATUS FOR TRACKING INSTRUCTION INFORMATION STORED IN VIRTUAL SUB-ELEMENTS MAPPED TO PHYSICAL SUB-ELEMENTS OF A GIVEN ELEMENT

BACKGROUND

The present technique relates to the field of the handling of processing instructions, for example instructions which will be issued for processing by processing circuitry. In some systems, information associated with instructions is to be temporarily stored. For example, some instructions may be branch instructions, which can cause processing flow to switch to a different stream of instructions. A branch target buffer may store predictions of the targets of such branch instructions, for example so that instructions according to the predicted branch can be fetched in advance of the processing flow reaching that point.

In modern processors, the production and storage of such information associated with instructions (for example prediction information such as the predictions stored in a branch target buffer) can be increasingly resource-intensive. There is therefore a desire for improved methods of handling such information, which can mitigate the incurred resource consumption.

SUMMARY

At least some examples provide an apparatus comprising:
instruction information generation circuitry to generate instruction information associated with respective instructions to be executed by processing circuitry;
instruction information storage circuitry comprising:
a plurality of elements, each said element comprising a plurality of physical sub-elements, each physical sub-element being configured to temporarily store a unit of instruction information;
allocation circuitry configured to:
  receive, from the instruction information generation circuitry, given instruction information to be stored in the instruction information storage circuitry;
  determine, for the storage of said given instruction information, a mapping of a plurality of ordered virtual sub-elements, such that each virtual sub-element maps onto a respective one of said physical sub-elements; and
  store the given instruction information into the virtual sub-elements of a given element, according to the mapping, such that at least one virtual sub-element lower in said order has a higher priority than at least one virtual sub-element higher in said order, and
sub-element deactivation circuitry configured to:
  track usage of said virtual sub-elements across the plurality of elements; and
  responsive to determining that usage of a given virtual sub-element satisfies a deactivation condition, deactivate said given virtual sub-element.

Further examples provide a non-transitory computer-readable medium to store computer-readable code for fabrication of the apparatus described above.

Further examples provide a method comprising:
generating instruction information associated with respective instructions to be executed by processing circuitry, to be stored in instruction information storage circuitry comprising a plurality of physical sub-elements, each physical sub-element being configured to temporarily store a unit of instruction information;
determining, for the storage of said instruction information, a mapping of a plurality of ordered virtual sub-elements, such that each virtual sub-element maps onto a respective one of said physical sub-elements; and
storing the instruction information into the virtual sub-elements of a given element, according to the mapping, such that at least one virtual sub-element lower in said order has a higher priority than at least one virtual sub-element higher in said order;
tracking usage of said virtual sub-elements across the plurality of elements; and
responsive to determining that usage of a given virtual sub-element satisfies a deactivation condition, deactivating said given virtual sub-element.

Further aspects, features and advantages of the present technique will be apparent from the following description of examples, which is to be read in conjunction with the accompanying drawings.

DESCRIPTION OF EXAMPLES

In an example according to the present disclosure, an apparatus comprises instruction information generation circuitry to generate instruction information associated with respective instructions to be executed by processing circuitry. A person skilled in the art will appreciate that these and other "circuitry" elements described herein could be implemented by dedicated circuitry (for example as hardware elements of a processing apparatus such as a processor). Alternatively, some or all of them could be implemented as functional or logical units of general-purpose circuitry, for example they may be implemented by routines run by a general purpose processor.

For example, the instruction information generation circuitry could be a prediction unit of a processing apparatus which predicts information associated with instructions, for example a branch target predictor which predicts the targets of branch instructions prior to their execution by the processing circuitry. The instruction information may thus be prediction information defining predictions associated with the instructions.

The apparatus further comprises instruction information storage circuitry. This comprises a plurality of elements, each said element comprising a plurality of physical sub-elements. Each physical sub-element is configured to temporarily store a unit of instruction information. The elements may thus store the aforementioned predicted information, with the information associated with a given instruction being stored in an associated sub-element. As an example, the instruction information storage circuitry may be a branch target buffer (BTB), with each element being a set of the branch target buffer and each sub-element being a particular way within that set. Thus, each sub-element can store a target of a particular branch instruction. In this example, each unit of instruction information may be a branch prediction associated with a corresponding instruction. The given instruction information may then comprise units of instruction information associated with a sequence of instructions, such that a given element efficiently stores branch predictions associated with each instruction in the sequence.

More generally, the instruction information storage circuitry may be a non-architectural cache (of which a BTB is an example), i.e. a cache which is resilient to false hits and false misses such that no functional problems would arise from a false hit or a false miss. Other than a BTB, examples include a cache in a prefetcher and a storage of caching information from way tracking.

The apparatus further comprises allocation circuitry, to allocate particular predictions to particular sub-elements of the instruction information storage circuitry.

More specifically, the allocation circuitry receives, from the instruction information generation circuitry, given instruction information to be stored in the instruction information storage circuitry. The given instruction information comprises information associated with one or more instructions.

The allocation circuitry determines, for the storage of said given instruction information, a mapping of a plurality of ordered virtual sub-elements, such that each virtual sub-element maps onto a respective one of said physical sub-elements. Thus, where the instruction information storage circuitry is a BTB and the sub-elements are ways thereof, the mapping may be a mapping of virtual ways onto corresponding physical ways.

The allocation circuitry stores the given instruction information into the virtual sub-elements of a given element, according to the mapping, such that at least one virtual sub-element lower in said order has a higher priority than at least one virtual sub-element higher in said order. For example, the virtual sub-elements may be conceptually numbered, with lower-numbered sub-elements prioritised over higher-numbered ways. As an example, if the given instruction information comprises information associated with three instructions and an entry has four sub-entries, the instruction information may be stored in the first three virtual sub-entries.

The allocation circuitry comprises sub-element deactivation circuitry which tracks usage of the aforementioned virtual sub-elements across the plurality of elements. In response to determining that the usage of a given virtual sub-element satisfies a deactivation condition (for example if that virtual sub-element is under-used), the sub-element deactivation circuity deactivates that virtual sub-element.

The present apparatus can thus save significant power by adaptively deactivating virtual sub-elements (e.g. virtual ways of a BIB), based on operating conditions.

The allocation circuitry may be further configured to receive subsequent instruction information and to determine a new mapping, different to the aforementioned mapping, for the storage of the subsequent instruction information. This subsequent instruction information can then be stored into the virtual sub-elements of a given element, according to the new mapping. This spreads the storage across the physical sub-elements of a given element (for example by changing the mapping which each new received instruction information), allowing for more efficient resource usage.

In some examples, the allocation circuitry is configured to determine the mapping by applying a per-sub-element skew to the ordering of the physical sub-elements. For example, if the physical sub-elements are numbered [0, 1, 2, 3], the corresponding virtual sub-elements may be numbered [3, 0, 1, 2]. This provides a computationally efficient way to determine the mapping. The per-sub-element skew may be a variable which is calculated for each given received instruction information. Thus, the mapping can be efficiently changed on a per-instruction-information basis by adjusting the skew. As an example, the skew may be determined as a hash of a current value of a program counter (which changes from instruction to instruction, thereby regularly changing the skew in a pseudorandom manner).

In an example, the deactivation condition is that usage of the aforementioned given virtual sub-element is below a usage threshold. Thus, when the given virtual sub-element (e.g. a lowest-priority, or highest-numbered) virtual sub-element would have sufficiently high usage, it can be enabled, and it can be deactivated adaptively when its usage would drop. This provides an effective way of implementation the aforementioned deactivation and thus saving overall power consumption.

In one such example, the usage threshold and corresponding deactivation can be implemented by way of a buffer storage. In this example, the sub-element deactivation circuitry is responsive to determining that the given instruction information is to be stored in a number of virtual sub-elements, equal to or greater than a currently active number of virtual sub-elements, to store a copy of at least one unit of said given instruction information in the buffer storage. The sub-element deactivation circuitry is correspondingly configured to determine that usage of the given virtual sub-element is below a usage threshold based on the buffer storage. For example, it may be determined that the deactivation condition is satisfied based on a lack of overflowing of the buffer storage. In other words, the buffer storage may act as a pseudo-virtual-sub-element, for storing instruction information which does not fit into the current number of active virtual sub-elements (e.g. if the fourth virtual sub-element is deactivated, entries that would have been stored in the fourth virtual sub-element can be stored in the buffer). Thus, if the buffer is not overflowing, it can be inferred that the virtual sub-elements are not being completely used, and one can be deactivated.

Alternatively or additionally, the sub-element deactivation circuitry may be configured to, responsive to determining that usage of a given deactivated virtual sub-element satisfies a reactivation condition, reactivate the given deactivated virtual sub-element. This can be considered the inverse of the aforementioned deactivation.

As an example, the reactivation condition is that usage of the given virtual sub-element would exceed a usage threshold. Thus, in contrast with the above-described deactivation, a deactivated virtual sub-element can be reactivated if it would be sufficiently used (e.g. to a degree which is considered to justify the power usage associated with reactivating the virtual sub-element). For example, analogously to the above use of a buffer, the reactivation may also be implemented by way of a buffer storage (e.g. the same buffer). In this example, as above, the sub-element deactivation circuitry is responsive to determining that the given instruction information is to be stored in a number of virtual sub-elements, equal to or greater than a currently active number of virtual sub-elements, to store a copy of at least one unit of said given instruction information in the buffer storage. The sub-element deactivation circuitry is configured to determine that usage of the given deactivated virtual sub-element would be above the usage threshold based on the buffer storage. For example, the reactivation condition may be deemed to be met based on an overflowing of the buffer storage with instruction information to be stored in a number of virtual sub-elements greater than the currently active number of virtual sub-elements. In this way, analogously to the above-described deactivation, if the buffer is overflowing with instruction information that would have been stored in a deactivated virtual sub-element (had it been active), it can be inferred that the deactivated virtual sub-element would (if reactivated) be sufficiently used to justify reactivation.

In an example, the allocation circuitry is configured to store the given instruction information into the virtual sub-elements of the given element in a priority order corresponding to said order such that each virtual sub-element of a given element has a higher priority than any virtual sub-elements higher in the order. This maximises the extent to which the received instruction information can fit into a number of virtual sub-elements below the maximum, thereby increasing the chance that one or more virtual sub-elements can be deactivated.

In such an example, the allocation circuitry may be configured to randomly vary the priority order of a lowest N virtual sub-elements of a given element, wherein N is less than a total number of virtual sub-elements of the given element. For example, if there are four virtual sub-elements, the priority order of the first two virtual sub-elements may sometimes be switched, whilst keeping them both at a higher priority than the third and fourth virtual sub-elements. This helps to avoid pathological cases that could occur with a fixed, rigid replacement policy, which can help maximise the utilisation of the lower-numbered virtual sub-elements.

The above description relates to the processing and storage of instruction information. A person skilled in the art will appreciate that the described functionality may form part of an instruction processing pipeline. For example, the apparatus may comprise instruction processing pipeline circuitry to retrieve, from the instruction information storage circuitry, instruction information associated with a given instruction to be executed. The instruction pipeline circuitry then, based on the instruction information associated with the given instruction, retrieves a subsequent instruction to be executed. The stored instruction information can thus be used to retrieve instructions.

Examples of the present disclosure will now be described with reference to the drawings.

Figure 1:
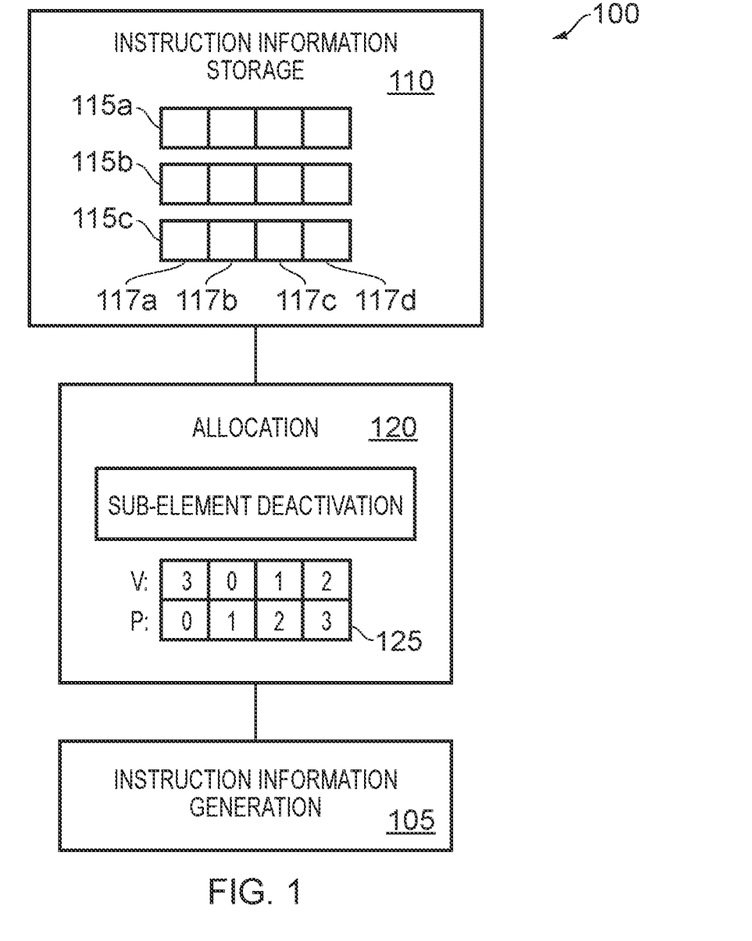
FIG. 1 schematically depicts an apparatus according to an example.

FIG. 1 schematically shows an apparatus 100 according to an example. The apparatus 100 comprises instruction information generation circuitry 105 which generates instruction information associated with respective instructions to be executed by processing circuitry. The instruction information generation circuitry 105 may be a branch predictor.

The apparatus 100 comprises instruction information storage circuitry 110, which has a plurality of elements 115a, 115b, 115c. Each of these elements comprises a plurality of sub-elements 117a, 117b, 117c, 117d which are each configured to temporarily store a unit of instruction information. For example, the instruction information storage circuitry may be a branch target buffer (BTB), with each sub-element 117a, 117b, 117c, 117d of a given element 115a, 115b, 115c storing a prediction for a different branch instruction.

The apparatus 100 comprises allocation circuitry 120. The allocation circuitry maintains a mapping 125 between physical sub-elements 117a, 117b, 117c, 117d of the instruction information storage 110 and corresponding virtual sub-elements. In the example of FIG. 1, physical sub-elements [117a, 117b, 117c, 117d]=[0, 1, 2, 3] are mapped onto virtual sub-elements [3, 0, 1, 2].

The allocation circuitry 120 receives instruction information from the instruction information generation circuitry 105 and stores it, based on the mapping, in the instruction information storage 110.

An example of the use of the apparatus 100 will now be described with reference to FIGS. 2 and 3. In this example, the instruction information storage circuitry 110 is a BTB, the elements 115a, 115b, 115c are sets thereof, and the sub-elements 117a, 117b, 117c. 117d are ways of each set.

Figure 2:
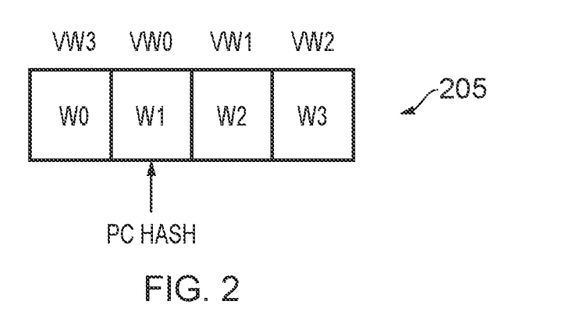
FIGS. 2 and 3 illustrate use of the apparatus of FIG. 1.

FIG. 2 depicts a single set 205 of the BTB. The set 205 comprises four physical ways W0, W1, W2 and W3. These are mapped onto four virtual ways VW0-VW4. The mapping is performed by applying a skew based on a hash of a current value of a program counter (which is incremented following each executed instruction). In the example of FIG. 2, the program counter hash gives a skew of 1, such that ways [W0, W1, W2, W3] are mapped onto virtual ways [VW3, VW0, VW1, VW2].

A given predict block is received, which contains branch predictions associated with a number of (potentially consecutive) branch instructions. For example, the predictions may each be associated with a given address. Each prediction is to be stored in a different way of the same set 205. In examples of the present disclosure, this storing is performed according to a replacement policy which preferentially uses a particular set of virtual ways (e.g. prioritising VW0 and VW1 over VW2 and VW3, or prioritising the virtual ways on numerical order such that VW0>VW1>VW2>VW3). In this manner, if a VW is to be left unused (e.g. because only 3 predictions are to be stored), it will be VW3.

Figure 3:
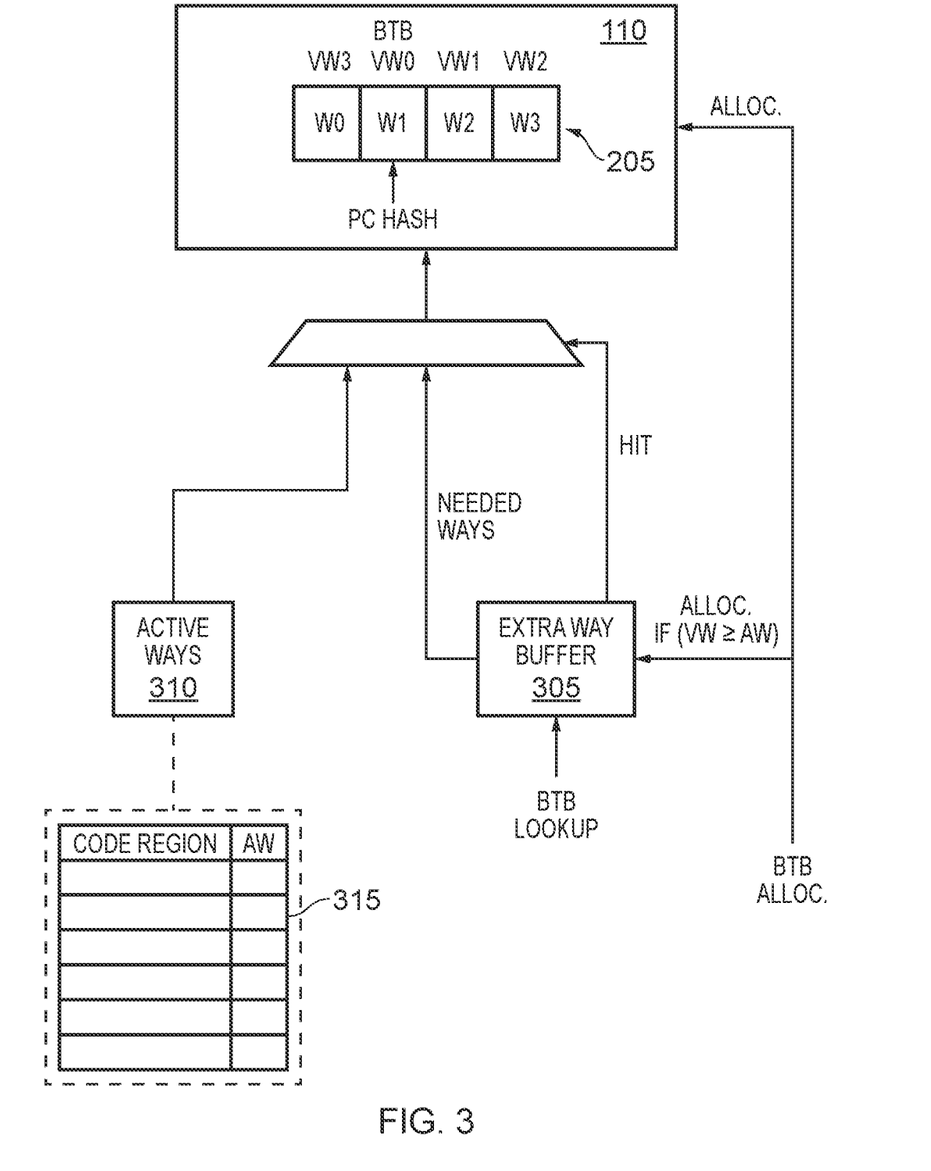

FIG. 3 shows a logical flow by which virtual ways can be adaptively enabled and disabled, within a BTB 110 comprising sets including the set 205 of FIG. 2.

In FIG. 3, virtual ways can be enabled and disabled based on operating conditions. To do this, an extra way buffer 305 is employed. The extra way buffer is a buffer storage which has the storage capacity of a virtual way, and can thus be used in lieu of a currently disabled way. For example, when VW3 is disabled, predictions which would have been stored in VW3 (e.g. because they were the fourth prediction in a block of fourth predictions, the other three being stored in VW0, VW1 and VW2) are instead stored in the extra way buffer 305. As described below, the extra way buffer 305 is used to assess whether the number of virtual ways could be reduced without significant performance impact (or whether the number of virtual ways should be increased to avoid a significant performance loss).

An indication of the currently active ways 310 is also maintained. This may for example by a n-bit mask, where n is the total number of ways (4 in this example).

Thus, a BTB allocation can be performed into the BTB for virtual ways up to the number of active ways, and into the extra way buffer for virtual ways higher than or equal to the number of active ways.

The usefulness of enabling a further virtual way can be assessed by monitoring the extra way buffer 305. If the buffer 305 is not overflowing, it can be inferred that the allocation rate is low such that the number of active ways can be reduced without significant performance impact. The number of active ways is thus reduced, and the prediction sets which would use the deactivated way(s) can be stored in the extra way buffer 305.

If the buffer 305 is overflowing with allocations requiring a number of virtual ways greater than the number of active ways, it can be inferred that a further virtual way should be enabled otherwise performance will suffer. The number of active ways is thus increased.

If the buffer is overflowing with allocations requiring a number of virtual ways equal to the number of active ways, it can be inferred that the number of active ways is appropriate, i.e. the system has reached a stable state. Thus, the number of active ways is kept the same.

The aforementioned overflowing is assessed by counting the overflowing during an observation window (which may be relatively long, for example thousands of cycles). The above-described overflow conditions may be deemed to be met if the number of overflows within an observation window exceeds a threshold. These thresholds could be tuned to maximise performance.

In an optional extension, a table 315 may be implemented in which a number of active ways is stored for each of a plurality of program code regions. This can be seen as effectively a metric of the branch density in each code region. For example, when an appropriate number of active ways is determined as described above, that number may be stored. This allows the number of active ways to be set when that code region is re-entered, without waiting until an observation window has completed. System performance is thereby improved.

Figure 4:
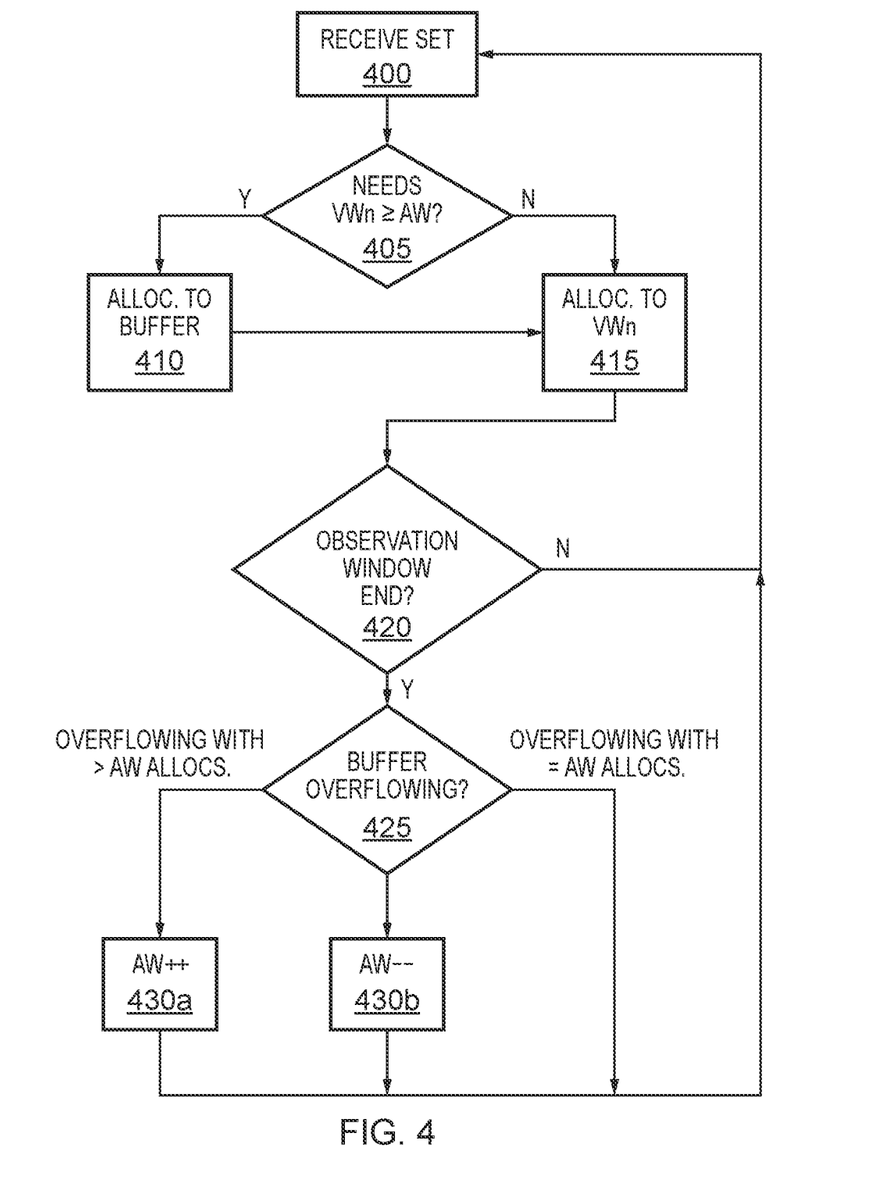
FIG. 4 depicts a method according to an example.

FIG. 4 depicts the above-described method in more detail.

At block 400, a set of prediction information is received.

At block 405, it is determined whether the set is to be stored in a number of virtual ways equal to or greater than the current number of active ways. If so, flow proceeds to block 410 where the predictions are stored in the buffer 305. Either way, flow proceeds to block 415 where the predictions which fit into the currently active ways are allocated thereto.

It is then determined at block 420 whether the observation window has ended. If not, flow returns to block 400.

If the observation window has ended, it is determined at block 425 whether the buffer 305 is overflowing. If it is overflowing with allocations that would use a number of virtual ways higher than the number of active ways, the number of active ways is increased at block 430*a*.

If the buffer 305 is not overflowing, the number of active ways is reduced at block 430*b*.

If the buffer 305 is overflowing with allocations that use a number of virtual ways equal to the number of active ways, no adjustment is made to the number of active ways.

Whatever adjustment (or lack thereof) is made to the number of active ways, a new observation window is begun and flow returns to block 400.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Figure 5:
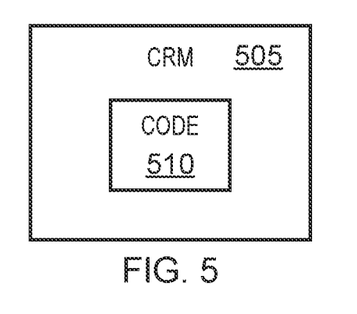
FIG. 5 depicts a computer-readable medium according to an example.

FIG. 5 shows an example of such a computer-readable medium 505, which comprises code 510 for fabrication of one or more of the apparatuses described herein.

Figure 6:
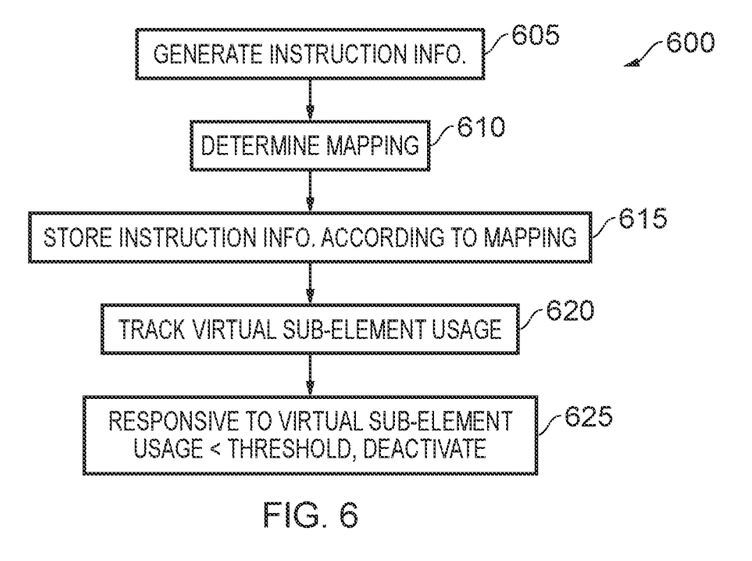
FIG. 6 depicts a method according to an example.

FIG. 6 schematically depicts a method 600 according to an example of the present disclosure.

At block 605, instruction information is generated as described above. The instruction information is associated with respective instructions to be executed by processing circuitry, to be stored in instruction information storage circuitry comprising a plurality of physical sub-elements, each physical sub-element being configured to temporarily store a unit of instruction information.

At block 610 there is determined, for the storage of said given instruction information, a mapping of a plurality of ordered virtual sub-elements, such that each virtual sub-element maps onto a respective one of said physical sub-elements.

At block 615 the instruction information is stored into the virtual sub-elements of a given element, according to the mapping, such that at least one virtual sub-element lower in said order has a higher priority than at least one virtual sub-element higher in said order.

At block 620, the usage of said virtual sub-elements across the plurality of elements is tracked.

At block 625, responsive to determining that usage of a given virtual sub-element satisfies a deactivation condition, said given virtual sub-element is deactivated.

Apparatuses and methods are thus provided for handling and storing temporary copies of instruction information.

From the above description it will be seen that the techniques described herein provides a number of significant benefits. In particular, by adaptively enabling and disabling sub-elements of a storage, power is saved without significant loss of performance.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   instruction information generation circuitry to generate instruction information associated with respective instructions to be executed by processing circuitry;
   instruction information storage circuitry comprising:
      a plurality of elements, each element comprising a plurality of physical sub-elements and storing a plurality of units of the instruction information, each physical sub-element being configured to temporarily store a unit of instruction information of the plurality of units of the instruction information;
   allocation circuitry configured to:
      receive, from the instruction information generation circuitry, the units of the instruction information to be stored in the instruction information storage circuitry;
      determine, for the storage of the units of the instruction information in a given element of the plurality of elements, a mapping of a plurality of ordered virtual sub-elements, each virtual sub-element is numbered according to an order, such that each virtual sub-element maps onto a respective physical sub-element of the plurality of physical sub-elements of the given element; and
      store the units of the instruction information of the given element into the virtual sub-elements mapped to the physical sub-elements of the given element, based on the mapping, such that at least one of the virtual sub-elements corresponding to a lower number in the order has a higher priority than at least one of the virtual sub-elements corresponding to a higher number in the order, and
   sub-element deactivation circuitry configured to:
      track usage of the plurality of ordered virtual sub-elements across the plurality of elements; and
      responsive to determining that usage of a given virtual sub-element satisfies a deactivation condition, deactivate the given virtual sub-element.

2. The apparatus according to claim 1, wherein the instruction information is prediction information defining predictions associated with the instructions.

3. The apparatus according to claim 1, wherein:
   the instruction information storage circuitry is a branch target buffer; and
   each unit of the instruction information is a branch prediction associated with a corresponding instruction.

4. The apparatus according to claim 3, wherein the units of the instruction information are associated with a sequence of instructions.

5. The apparatus according to claim 1, wherein the allocation circuitry is configured to:
   receive subsequent units of instruction information;
   determine a new mapping, different from the mapping, for storage of the subsequent units of instruction information; and
   store the subsequent units of instruction information into virtual sub-elements of a given element, based on the new mapping.

6. The apparatus according to claim 1, wherein the allocation circuitry is configured to determine the mapping by applying a per-sub-element skew to an ordering of the physical sub-elements.

7. The apparatus according to claim 6, wherein the allocation circuitry is configured to determine the per-sub-element skew as a variable which is calculated for the received units of the instruction information.

8. The apparatus according to claim 7, wherein the allocation circuitry is configured to determine the per-sub-element skew as a hash of a current value of a program counter.

9. The apparatus according to claim 1, wherein the deactivation condition is that usage of the given virtual sub-element is below a usage threshold.

10. The apparatus according to claim 9, comprising a buffer storage, wherein:
    the sub-element deactivation circuitry is responsive to determining that the units of the instruction information are to be stored in a number of virtual sub-elements, equal to or greater than a currently active number of virtual sub-elements, to store a copy of at least one unit of the units of the instruction information in the buffer storage; and
    the sub-element deactivation circuitry is configured to determine that usage of the given virtual sub-element is below a usage threshold based on the buffer storage.

11. The apparatus according to claim 10, wherein the sub-element deactivation circuitry is configured to determine that the deactivation condition is satisfied based on a lack of overflowing of the buffer storage.

12. The apparatus according to claim 1, wherein the sub-element deactivation circuitry is configured to, responsive to determining that usage of a given deactivated virtual sub-element satisfies a reactivation condition, reactivate the given deactivated virtual sub-element.

13. The apparatus according to claim 12, wherein the reactivation condition is that usage of the given deactivated virtual sub-element would exceed a usage threshold.

14. The apparatus according to claim 13, comprising a buffer storage, wherein:
- the sub-element deactivation circuitry is responsive to determining that the units of the instruction information is to be stored in a number of virtual sub-elements, equal to or greater than a currently active number of virtual sub-elements, to store a copy of at least one unit of the units of the instruction information in the buffer storage; and
- the sub-element deactivation circuitry is configured to determine that usage of the given deactivated virtual sub-element would be above the usage threshold based on the buffer storage.

15. The apparatus according to claim 14, wherein the sub-element deactivation circuitry is configured to determine that the reactivation condition is satisfied based on an overflowing of the buffer storage with instruction information to be stored in a number of virtual sub-elements greater than the currently active number of virtual sub-elements.

16. The apparatus according to claim 1, wherein the allocation circuitry is configured to store the units of the instruction information into the virtual sub-elements of the given element in a priority order corresponding to the order such that each virtual sub-element of the given element has a higher priority than any other virtual sub-element of the given element corresponding to a higher number in the order.

17. The apparatus according to claim 16, wherein the allocation circuitry is configured to randomly vary the priority order of a lowest N virtual sub-elements of the given element, wherein N is less than a total number of virtual sub-elements of the given element.

18. The apparatus according to claim 1, comprising instruction processing pipeline circuitry to:
- retrieve, from the instruction information storage circuitry, instruction information associated with a given instruction to be executed; and
- based on the instruction information associated with the given instruction, retrieve a subsequent instruction to be executed.

19. A non-transitory computer-readable medium to store computer-readable code for fabrication of the apparatus of claim 1.

20. A method comprising:
- generating instruction information associated with respective instructions to be executed by processing circuitry, to be stored in instruction information storage circuitry comprising a plurality of elements, each element comprising a plurality of physical sub-elements and storing a plurality of units of the instruction information, each physical sub-element being configured to temporarily store a unit of instruction information of the plurality of units of the instruction information;
- determining, for the storage of the units of the instruction information for a given element of the plurality of elements, a mapping of a plurality of ordered virtual sub-elements, each virtual sub-element is numbered according to an order, such that each virtual sub-element maps onto a respective physical sub-element of the plurality of physical sub-elements of the given element; and
- storing the units of the instruction information of the given element into the virtual sub-elements mapped to the physical sub-elements of the given element, based on the mapping, such that at least one of the virtual sub-elements corresponding to a lower number in the order has a higher priority than at least one of the virtual sub-element corresponding to a higher number in the order;
- tracking usage of the plurality of ordered virtual sub-elements across the plurality of elements; and
- responsive to determining that usage of a given virtual sub-element satisfies a deactivation condition, deactivating the given virtual sub-element.

\* \* \* \* \*